April 3, 1928.

G. E. PERDUE 1,664,896

GRINDSTONE ATTACHMENT FOR SAUSAGE MILLS

Filed Sept. 16, 1925

Inventor:
George E. Perdue,

Attorney

Patented Apr. 3, 1928.

1,664,896

UNITED STATES PATENT OFFICE.

GEORGE E. PERDUE, OF SANTA MONICA, CALIFORNIA.

GRINDSTONE ATTACHMENT FOR SAUSAGE MILLS.

Application filed September 16, 1925. Serial No. 56,786.

Sausage mills being commonly provided with power means, such as electric motors, for the rotation of internal parts such as spiral feeding elements and cutters, it is an object of this invention to obviate the necessity for providing separate motors for the operation of knife grinders, or the like; and it is an especial object of this invention to provide a grinding attachment requiring no additional or separate gearing and adapted to be quickly applied to or disconnected from the outlet ends of sausage machines, or the like, of types now in use,—utilizing the power thereof, whenever desired, for the rotation of a grindstone or a buffing wheel, or the like.

It is an object of this invention to provide an auxiliary organization or attachment of the general character referred to which comprises an extension shaft, carrying at one end the mentioned grindstone, or its equivalent, and carrying at its opposite end a squared socket, or equivalent means adapted to transmit motion from the squared outer end of a substantially horizontal shaft such as is commonly included in sausage machines,—the mentioned squared end being intended by the original manufacturer for the rotation of removable cutter discs; and a preferred embodiment of my invention may comprise also a bearing extension, herein shown as substantially conical in general form, this extension being provided with one or more transversely extending webs through which the mentioned extension shaft may extend; and the said bearing extension may advantageously be provided at its larger end with internal threads adapted to engage external threads such as are commonly provided on the outer or delivery ends of sausage machine bodies,—these external threads being intended by the manufacturer for engagement by corresponding threads upon holding rings, for the retention of fixed or movable cutting elements at the outlet or delivery ends of the sausage machines.

Figure 1:
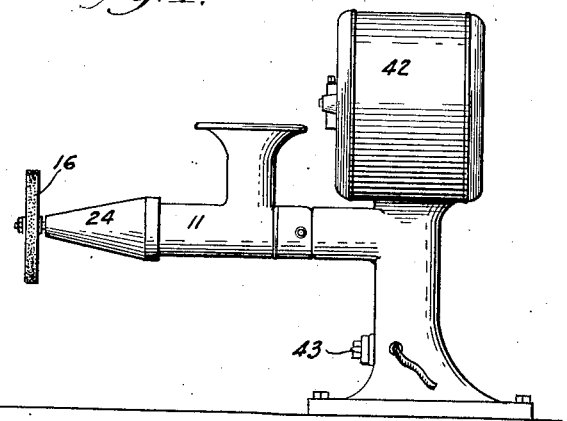

Other objects of my invention, including certain details of bearing construction and grindstone attachment, may be best understood form the following description of an illustrative embodiment thereof, taken in connection with the appended claim and the accompanying drawings, in which Fig. 1 is an elevational view showing a sausage machine as equipped with an embodiment of my invention.

Figure 2:
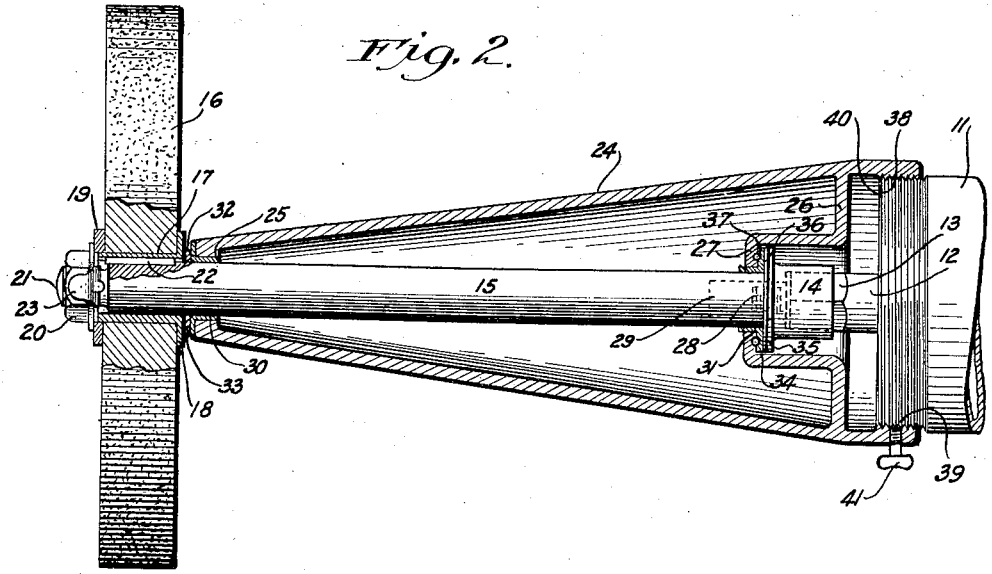

Fig. 2 is an enlarged view, taken from the same direction, but showing my novel bearing extension and other parts as sectioned in a substantially median plane.

Referring to the details of that specific embodiment of my invention chosen for purposes of illustration, 11 being the delivery or outlet end of a sausage machine, and 12 being a substantially horizontal shaft (which may be integral with spiral meat-advancing blades, not shown), the squared outer end 13 of the shaft 12, (intended by the original manufacturer for the rotation of cutting blades) may be utilized, as by means of a squared socket 14, for the rotation of a shaft 15, carrying at its outer end a grindstone 16, or its equivalent,—any suitable means being provided for maintaining the shaft 12 and the extension shaft 15, or its equivalent, in end to end contact and in alignment.

I show the grinding element 16 as in the form of an ordinary wheel having a central reinforcing attachment thimble 17, the latter being provided at one end with a fixed bearing flange 18 and at its opposite end with a washer 19, retained by a nut 20, engaging a threaded terminal portion 21 of the extension shaft 15,—means such as a key 22 and a resilient nut lock clip 23 being optionally provided to prevent unintended relative rotation of the parts last referred to; and I show the extension shaft 15 as supported by means comprising a substantially conical bearing extension 24, terminating outwardly in an apertured transverse web 25 and provided near its inner end with an additional transverse web 26. The latter may be centrally offset or provided with a boss 27, apertured to receive and support the enlarged inner end of the shaft 15 and the mentioned non-circular socket 14, which is adapted to receive the correspondingly non-circular end of the driven shaft 12.

The shaft 12 being in some instances provided with a threaded projection 28, I may chamber the inner end of the extension shaft 15 substantially in the manner indicated at 29, to provide clearance therefor; and I show the respective transverse webs 25 and 26 as provided with bearing thimbles 30 and 31. The former of these is shown as flanged at 32 in a manner favorable to its engagement by the flange 18 upon the stone-attachment thimble 17, or by an interposed washer 33; and the latter is shown as provided with a flange 34, adapted to engage a shoulder 35 upon the shaft 15 in such manner as to hold the described parts in the assembled relationship in which they are shown,—the interposition of an additional washer 36 and the use of ball bearings 37, or their equivalent, being optional.

The inner end 38 of the bearing extension 24, or its equivalent, is preferably of such diameter as to enable the same to interfit with the outer surface of the delivery or outlet end of the sausage machine, or its equivalent, to which my knife grinding attachment is to be secured; and when the said delivery end of the sausage machine, or its equivalent, is provided with external threads 39, (as for the purpose of retaining the holding rings intended by the manufacturer for use in the retention of fixed or movable cutting blades or plates) I may provide the said inner end 38 of the described bearing extension with cooperating internal threads 40. In conjunction with or independently of this threaded connection I may optionally use securing means such as a set screw 41; but, when anti-friction devices of the general character above suggested are employed, it will be understood that no appreciable torque need be transmitted from the shaft 12, or its equivalent, to the bearing extension 24, or its equivalent.

When knives are to be sharpened, it will be obvious that, upon placing the shafts 12 and 15 in alignment and rotating the bearing extension 24 in such manner as to effect an engagement of the threads 39 by the threads 40, the described grinding attachment is secured in place, the operation of the motor 42, or its equivalent (as by a closing of the switch 43) being then effective to rotate the grinding wheel 16, or its equivalent; and the rate of rotation of the shaft 12, as predetermined by internal gearings (not shown) is found to be entirely favorable to the sharpening of knives, or the like, upon the grinding wheel 16. It will be obvious that a reversal of the described movements is promptly effective to remove the grinding attachment, permitting the mentioned cutting blades and holding ring to be replaced and the sausage mill to be alternatively used in the comminuting of meat, or the like, in the manner intended by its original manufacturer.

Although I have herein described a simple complete embodiment of my invention, it will be obvious that various features thereof might be independently used, and also that numerous modifications might be made, by those skilled in the art to which this case relates, without the slightest departure from the spirit and scope of my invention, as the same is indicated above and in the following claim.

I claim as my invention:

In a grinding attachment for a sausage machine comprising a horizontal shaft projecting from its outer end: an extension shaft rotatable by said shaft; a grinding wheel on said extension shaft; and a relatively long conical bearing extension adapted to doubly support said extension shaft and provided with means for its support from said outlet end of the sausage machine, the larger end of said bearing extension being internally provided with threads adapted to cooperate with external threads provided on said outlet end and also with a transverse web carrying a boss for the support of a bearing for said shaft.

In testimony whereof, I have hereunto set my hand at Gardena, California, this 10th day of September, 1925.

GEORGE E. PERDUE.